Sept. 20, 1955  W. F. ALLER  2,718,140
SIZE GAUGING DEVICE
Filed April 8, 1950
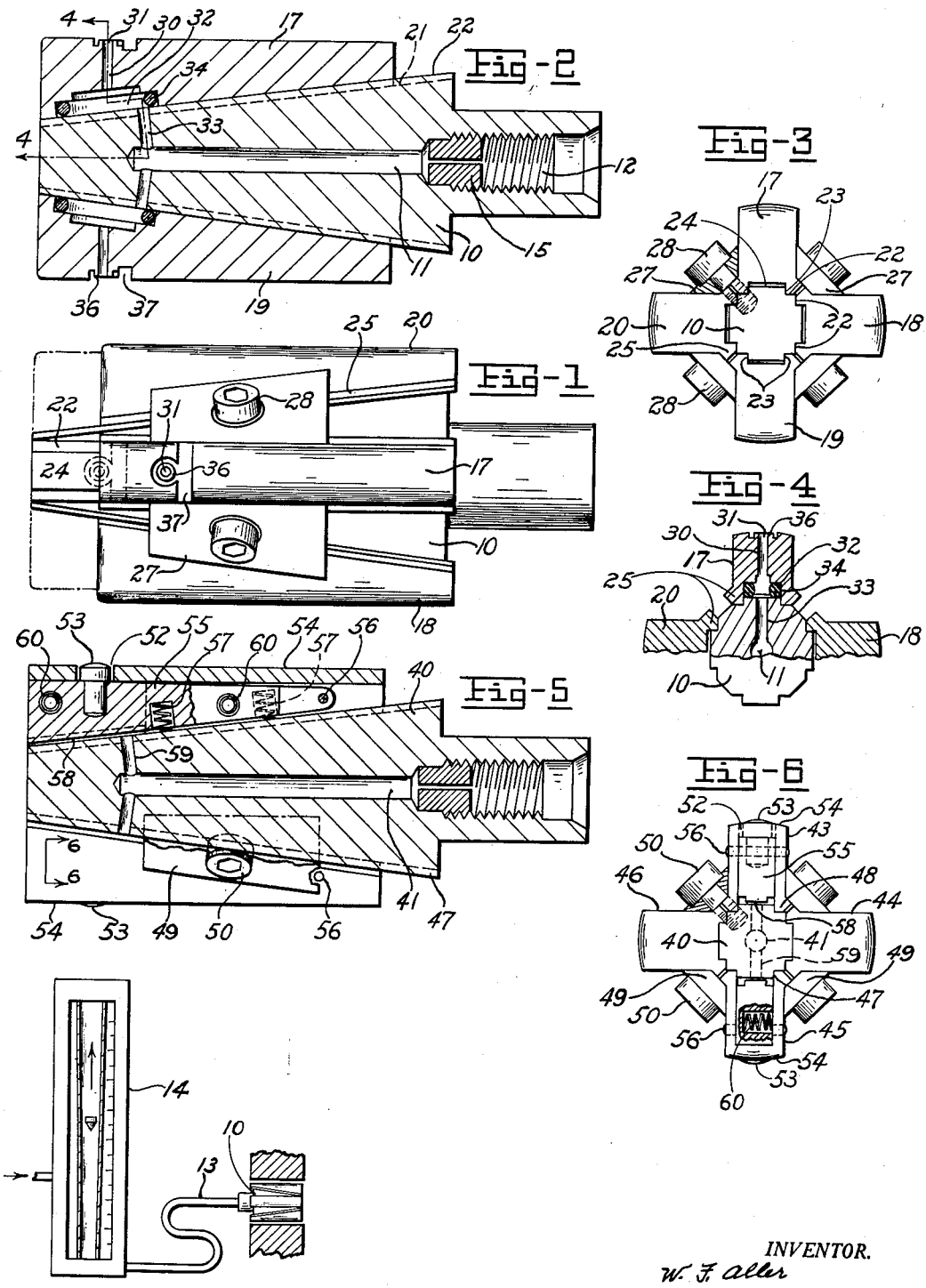
INVENTOR.
W. F. Aller
BY Edward T. Noeh
atty.

United States Patent Office 2,718,140
Patented Sept. 20, 1955

2,718,140

SIZE GAUGING DEVICE

Willis Fay Aller, Dayton, Ohio, assignor to The Sheffield Corporation, Dayton, Ohio, a corporation of Ohio Application April 8, 1950, Serial No. 154,853

14 Claims. (Cl. 73—37.5)

This invention relates to gauging devices and more particularly to gauge heads adapted for cooperation with a part to be gauged, the principal object of the invention being the provision of a gauge head which is adjustable in size so it can be adjusted to accommodate different sizes of parts.

It is a further object of the invention to provide an adjustable gauge head capable of accommodating articles or workpieces to be gauged in which the size of the gauged surface may vary considerably throughout a predetermined range, and in which the gauging is accomplished in terms of fluid leakage from a leakage orifice in accordance with the size of the workpiece.

Another object is the provision of a gauge head having a body provided with a plurality of inclined guideways accommodating a plurality of radially projecting portions or blocks which are adjustable on the guideways to vary the diameter determined by the outer parts of such portions.

A further object is the provision of an adjustable gauge head in which the gauging is accomplished in terms of fluid leakage, the adjustable blocks or at least one of them, having a gauging orifice which communicates with a passage in the central body, with sealing means between the block and the body.

Other objects and advantages of the invention will be apparent from the following description, the appended claims and the accompanying drawing, in which Fig. 1 is a side elevation of a gauging head embodying the present invention;

Fig. 2 is a central longitudinal section through the gauge head;

Fig. 3 is an end view of the gauge head;

Fig. 4 is a section on the line 4—4 of Fig. 2;

Fig. 5 is a longitudinal section through a gauge head of modified construction in which the fluid leakage orifice is controlled by the workpiece through the intermediary of a mechanical contacting element;

Fig. 6 is an end view of the gauge head shown in Fig. 5, with a portion shown in section on the line 6—6 of Fig. 5; and Fig. 7 is a view on a reduced scale showing the gauge head connected to a fluid supply and measuring apparatus and with the gauge head shown applied to a workpiece.

Referring more particularly to the drawing in which the same reference numerals are used to designate similar parts in the different views, Figs. 1 to 4 show one embodiment of the invention. In this form of construction the gauge head is constructed to gauge an internal diameter by gauging or comparing the amount of fluid leakage taking place from a leakage orifice which is controlled in accordance with the diameter of the workpiece. It will be obvious that the gauge head may be used as a plug gage of adjustable size without applying air or other fluid under pressure, and that the gauge head may be constructed to gauge external instead of internal diameters. As shown, the gauge head comprises a body 10 having a fluid passage 11 which extends from a threaded supply passage 12. This passage is adapted to be connected to a supply tube such as the tube 13 as shown in Fig. 7, this tube extending to a fluid flow gauging or measuring apparatus generally illustrated at 14. Air under regulated pressure is supplied to the gauging apparatus 14 and passes through the tube 13 and then into the passage 11 of the gauge head. If desired, a flow restricting member 15 may be provided in the flow passage so as to prevent an excessive amount of air flow when the gauge is not applied to the workpiece.

The body 10 has a plurality of guide surfaces extending longitudinally and at an angle to the axis of the body and adjustably mounted on these guide surfaces are radially extending blocks 17, 18, 19 and 20, there being four of these blocks in the particular form of construction illustrated for exemplary purposes. The outer surfaces of the blocks lie parallel to the axis of the body and are curved, as shown in Fig. 3, concentric to the body axis. Since the inner ends of the blocks are inclined, it will be apparent by adjusting the blocks longitudinally on the body the outer diameter defined by the outer portions of the blocks can be changed to a considerable degree so that the gauge head can be adjusted for gauging openings of different diameters.

The guide surfaces 21 on the body are each preferably constructed to provide outwardly facing ledges 22 and laterally facing ledges 23. Between each pair of ledges 23, the body has a flat outwardly facing surface 24. The blocks 17 to 20 inclusive each have feet 25 fitting against ledges 22 and 23, the middle portions of the block being slightly spaced from the surfaces 24 on the body and each of the blocks being slightly spaced from the feet of adjacent blocks. Wedge clamps 27 fit against the outer portions of the feet of the blocks with each clamp engaging and holding the feet of two adjacent blocks as will be apparent from Fig. 3. Clamp screws 28 extending through the clamps 27 and threaded in the body serve when tightened to hold the clamps securely against the feet of the blocks and thus hold the blocks firmly in any position of adjustment. When the clamps are loosened however, it will be apparent that the blocks may be moved axially or longitudinally to change the diameter.

The block 17 has a fluid passage 30 terminating in a fluid leakage orifice 31. The passage 30 communicates at its inner end with a groove 32 that extends longitudinally of the block and which is of such length as to provide communication, in all normal positions of adjustment with the outer end of a passage 33 that leads to the passage 11. An oval sealing ring 34 of rubber or other suitable material contained in the groove 32 forms a seal between the body 10 and the block. It will be understood that fluid supplied under pressure to the passage 11 flows through the passage 33, the groove 32, the passage 30 and leaks from the discharge leakage orifice 31 between the work surface and the outer surface 36 of the discharge orifice. The surface 36 is preferably depressed or recessed a few ten-thousandths of an inch below the surface contour of the block. The air discharged past the surface 36 is relieved through the relief slots 37 to atmosphere. The amount of leakage that takes place depends upon the clearance between the surface 36 and the workpiece. Such a leakage orifice and similar connections to the common passage 11 may be arranged in all four of the blocks, although preferably those orifices are in two opposed blocks such as blocks 17 and 19.

Fig. 1 shows the blocks in solid lines adjusted to accommodate the maximum size openings, while the dot and dash lines indicate the position of the blocks for minimum size opening.

Where diameter measurements are made by determining the leakage from a gauging orifice cooperating with the workpiece, it has been the practice to employ a gauging head having a fixed orifice location. This distance from the workpiece to the end of the fluid leakage nozzle facing the workpiece has to be comparatively small, on the order of a few thousandths of an inch or less, to obtain readily measured pressure or flow differences as required in accurately gauging a hole. It will therefore be apparent that heretofore a gauge head could not be used for holes that differed in diameters by more than a few thousandths of an inch. In accordance with the present invention, however, the adjustment of the blocks permits a wide range of diameter adjustment so that the gauge can be set, within its range of adjustment, to accommodate large holes or small holes, depending upon the particular requirements of the gauging operation, and the adjustment is very simply effected merely by loosening the clamp screws 28 and sliding the blocks longitudinally. The exact positions of the blocks are determined by inserting the gauge head in a master workpiece of known size and obtaining the desired reading on the gauging apparatus employed with the gauge head. When the gauge head is then used with a workpiece of unknown size, the reading obtained on the gauging apparatus gives a comparison of size with the master so that the size of the workpiece is readily obtained.

In the form of construction shown in Figs. 5 and 6 the body 40 having a passage 41 is similar to the body shown in Figs. 1 to 4. The blocks 43, 44, 45 and 46 that are adjustable longitudinally along the body on the guideways 47 are U-shaped members having feet 48 similar to the feet of the blocks 17 to 20. Clamps 49 and clamp screws 50, similar to the clamps and screws employed in the form of construction first described, serve to hold the blocks 43 to 46 in their various position of adjustment along the guideways 47. In this form of construction the control of the fluid leakage that takes place from a leakage orifice or orifices is affected by the workpiece through the intermediary of a mechanical contacting element or elements. Thus the two opposed blocks 43 and 45 have openings 52 providing passages in which work contacting studs 53 operate. These studs project normally a little distance from the outer surface 54 of the blocks, the studs being fixed on blades 55 pivotably mounted on pins 56 carried by the blocks. Springs 57 are contained in recesses in the blades 55 with the inner ends of the springs engaging the outer surface of the body so that the blades are normally held outwardly under light spring tension in the position shown in Fig. 5. And in this position an orifice controlling flat surface 58 on the inner side of the blade is substantially spaced from the outer end of the passage 59 in the body so that air flows out rather freely from the passage 59 and is relieved to atmosphere. When the gauge head is applied to the workpiece the studs 53 are moved inwardly by the workpiece and partially close the ends of the passages 59 so that flow through these leakage orifices at the ends of passages 59 can be gauged, and the size of the workpiece determined. Lateral recesses are preferably provided in the blades and contain springs 60 bearing against one side of the blocks so that side play of the blades within the blocks is thus taken up.

The orifice controlling surface 58 on the inside of the blade is long enough to control flow through the end of the passage 59 in any position of adjustment.

While the forms of apparatus herein described constitute preferred embodiments of the invention, it is to be understood that the invention is not limited to the precise forms of apparatus shown, and that changes may be made therein without departing from the scope of the invention defined in the appended claims.

What is claimed is:

1. An adjustable gauge head adapted for cooperation with a workpiece to gauge a size of a workpiece in terms of fluid leakage from a fluid leakage orifice controlled by the workpiece, comprising a body, a plurality of radially projecting blocks adjustably mounted on said body, cooperating means on the blocks and the body to radially position the blocks in accordance with their adjustment on the body so that the diameter of a cylinder containing the outer portion of the blocks is determined by the adjustment of the blocks on the body, means for positively securing said blocks to said body in various positions of adjustment, at least one of said blocks having an orifice on its outer surface controlled by the workpiece to provide leakage of fluid under pressure at a rate dependent upon the size of the workpiece, and a passage in said body in communication with said orifice and adapted for connection to a source of fluid under pressure.

2. An adjustable gauge head adapted for cooperation with a workpiece to gauge a physical characteristic of the workpiece, comprising a body having a passage adapted for connection at one end thereof of a source of fluid under pressure, said body having a plurality of annularly spaced longitudinally extending guideways inclined to the axis of the body, a plurality of longitudinally extending radially projecting blocks adjustably mounted on said guideways each of said guideways and the inner portion of the associated block having a pair of parallel guiding surfaces which cooperate to definitely position the block against annular movement on the body, means for positively securing said blocks to the body in their adjusted positions, at least one of said blocks having means adapted for cooperation with the workpiece to be gauged for controlling the flow of fluid supplied under pressure to the passage in the body.

3. An adjustable gauge head adapted for cooperation with a workpiece to gauge a size of the workpiece, comprising a body having a passage adapted for connection at one end thereof to a source of fluid under pressure, said body having a plurality of annularly spaced longitudinally extending guideways inclined to the axis of the body, a plurality of longitudinally extending blocks adjustably mounted on said guideways and having outwardly extending feet portions, each of said guideways and the inner portion of the associated block having a pair of parallel guiding surfaces which cooperate to definitely position the block against annular movement on the body, clamp means for engaging and securing said feet portions to the body to positively locate the blocks in fixed position in which the outer portions of the blocks are spaced various distances from the body axis in accordance with the longitudinal adjustment of the blocks on the body, at least one of said blocks having means adapted for cooperation with the workpiece to be gauged for controlling the flow of fluid supplied under pressure to the passage in the body.

4. An adjustable gauge head adapted for cooperation with a workpiece to gauge a size of the workpiece, comprising a body having a passage adapted for connection at one end thereof to a source of fluid under pressure, said body having a plurality of annularly spaced longitudinally extending guideways inclined to the axis of the body, a plurality of longitudinally extending outwardly projecting blocks adjustably mounted on said guideways, means for positively securing said blocks to said body in their adjusted positions, at least one of said blocks having an outwardly extending passage communicating with the passage in the body in the various positions of adjustment of the blocks, the passage in the blocks terminating in a gauging orifice facing the workpiece surface to be gauged for the control of leakage in accordance with the size of the workpiece surface.

5. An adjustable gauge head adapted for cooperation with a workpiece to gauge a size of the workpiece, comprising a body having a passage adapted for connection at one end thereof to a source of fluid under pressure, said body having a plurality of annularly spaced longitudinally extending guideways inclined to the axis of the body, a plurality of longitudinally extending outwardly projecting blocks adjustably mounted on said guideways, each of said guideways and the inner portion of the associated block having a pair of parallel guiding surfaces which cooperate to definitely position the block against annular movement on the body, means for positively securing said blocks to the body in their adjusted positions, at least one of said blocks having an adjustable blade movably supported therein for physical contact with the workpiece surface, said blade having an orifice controlling surface which controls the flow of fluid from the passage in the body in accordance with the size of the workpiece.

6. An adjustable gauge head adapted for cooperation with a workpiece to gauge a size of the workpiece, comprising a body provided with a plurality of annularly spaced longitudinally extending guideways uniformly inclined to the axis of the body, a plurality of longitudinally extending blocks adjustably mounted on said guideways and having outwardly extending feet portions, rigid clamp means for engaging and securing said feet portions to the body to locate the blocks in fixed position in which the outer portions of the blocks are spaced various distances from the body axis in accordance with the longitudinal adjustment of the blocks on the body, the outer portions of the blocks being substantially parallel to one another so that the diameter of the cylinder containing the outer portions of the blocks is determined by the axial location in which the blocks are fixed on the body.

7. An adjustable gauge head adapted for cooperation with a workpiece to gauge a size of the workpiece, comprising a body provided with a plurality of annularly spaced longitudinally extending guideways uniformly inclined to the axis of the body having seating depressions along their outward lateral edges, a plurality of longitudinally extending blocks adjustably mounted one on each of said guideways and having inwardly extending feet portions with lateral projections thereon, clamp means seated against said lateral projections for securing said feet portions to the body along the seating depressions to positively locate the blocks in fixed positions in which the outer portions of the blocks are placed various distances from the body axis in accordance with the longitudinal adjustment of the blocks on the body, the outer portions of the blocks being substantially parallel to one another so that the diameter of the cylinder containing the outer portions of the blocks is determined by the axial location in which the blocks are fixed to the body.

8. An adjustable gauge head adapted for cooperation with a workpiece to gauge a size of the workpiece, comprising a body having a passage adapted for connection at one end thereof to a source of fluid under pressure and provided with a plurality of annularly spaced longitudinally extending guideways uniformly inclined to the axis of the body having seating depressions along their outward lateral edges, a plurality of longitudinally extending blocks adustably mounted on said guideways and having inward extending feet portions with lateral projections thereon, a clamp between each pair of adjacent feet portions and seating against the lateral projections of adjacent blocks for securing said feet portions to the body along the seating depressions to positively locate the blocks in fixed position in which the outer portions of the blocks are spaced at various distances from the body axis in accordance with the longitudinal adjustment of the blocks on the body, the outer portions of the blocks being substantially parallel to one another so that the diameter of the cylinder containing the outer portion of the blocks is determined by the axial location in which the blocks are fixed to the body, at least one of said blocks having means adapted for cooperation with the workpiece to be gauged for controlling the flow of fluid supplied under pressure to the passage in the body.

9. An adjustable gauge head adapted for cooperation with a workpiece to gauge a size of the workpiece, comprising a body having a passage adapted for connection at one end thereof to a source of fluid under pressure, said body having a plurality of annularly spaced longitudinally extending guideways inclined to the axis of the body, a corresponding plurality of longitudinally extending outwardly projecting blocks, the body and each block having adjacent mating surfaces, each block having inwardly extending feet portions, clamping means for engaging said feet portions and securing said feet portions to the respective guideways to positively locate the blocks in the fixed position desired, at least one of said blocks having an outwardly extending passage therein, a longitudinally extended groove which has a length corresponding to the range of adjustment of said blocks in one of the mating surfaces at said outwardly extending passage providing communication between the passage in the body and the passage in the block in the various positions of the blocks, a sealing ring seated in said groove for cooperation with the other of the mating surfaces for sealing the connection, the passage in the blocks terminating in a gauging orifice facing the workpiece surface to be gauged for the control of leakage in accordance with the size of the workpiece surface.

10. An adjustable gauge head adapted for cooperation with a workpiece to gauge the size of a hole in the workpiece, comprising a body provided with a plurality of longitudinally extending guideways along its outer surface which are inclined to the axis of the body, a corresponding plurality of longitudinally extending blocks slidable on said guideways along the length of said body to adjusted radial positions, each of said guideways and the inner portion of the associated slidable block having a pair of parallel guiding surfaces which cooperate to definitely position the slidable block against annular movement on the body, the inward portions of the slidable blocks having lateral projections therealong, a clamping block between each pair of slidable blocks engaging the adjacent lateral projections for securing the slidable blocks in fixed positions along the length of the body and in their adjusted radial positions, a clamping screw passing through each clamping block and into the body, the radially outer portions of the slidable blocks being substantially parallel to one another so that the diameter of a cylinder containing the outer portions of the slidable blocks is determined by the axial location of the slidable blocks on the body.

11. An adjustable gauge head adapted for cooperation with a workpiece to gauge the size of a hole in the workpiece, comprising a body having a passage adapted for connection at one end thereof to a source of fluid under pressure, said body having a plurality of longitudinally extending guideways along its outer surface which are inclined to the axis of the body, a corresponding plurality of longitudinally extending blocks slidable on said guideways along the length of said body to adjusted radial positions, each of said guideways and the inner portion of the associated slidable block having a pair of parallel guiding surfaces which cooperate to definitely position the slidable block against annular movement on the body, the radially outer portions of the slidable blocks being substantially parallel to one another so that the diameter of a cylinder containing the outer portions of the slidable blocks is determined by the axial locations of the slidable blocks on the body, at least one of said slidable blocks having means adapted for cooperation with the workpiece to be gauged for controlling the flow of fluid under pressure to the passage in the body.

12. An adjustable gauge head for cooperation with a workpiece to determine the size of a hole in the workpiece in terms of fluid leakage from a fluid leakage orifice controlled by the workpiece, comprising an axially extending body having an adjustable block portion radially movable to different positions of fixed radial adjustment so that the outer parts thereof assume different distances from the axis of the body, means for positively securing said block portion to said body in adjusted radial positions, said block portion containing a fluid leakage orifice to determine the size of a hole in a workpiece, said body having means for supplying fluid under pressure to said orifice.

13. An adjustable gauge head for cooperation with a workpiece to determine the size of a hole in the workpiece in terms of fluid leakage from a fluid leakage orifice controlled by the workpiece, comprising an axially extending body having a plurality of adjustable block portions outwardly movable to different positions of fixed radial adjustment so that outer parts thereof assume different distances from the axis of the body, each of said block portions being elongated and having an outer cylindrically curved surface extending parallel to the body axis, means for positively securing said block portions to said body in adjusted radial positions, at least one of said block portions containing a fluid leakage orifice to determine the size of a hole in a workpiece, said body having means for supplying fluid under pressure to said orifice.

14. An adjustable gauge head for cooperation with a workpiece to determine the size of a hole in a workpiece in terms of fluid leakage from a fluid leakage orifice controlled by the workpiece, comprising an axially extending body having a fluid supply passage, and having an adjustable block portion movable on the body to different positions of fixed radial adjustment so that the outer parts thereof assume different distances from the axis of the body, said block portion being elongated and having an outer cylindrically curved surface extending parallel to the body axis, means for positively securing said block portion to said body in adjusted radial positions, a work contacting element movably carried by said block portion and a fluid leakage orifice controlled by said element to control flow of fluid through said supply passage.

References Cited in the file of this patent

UNITED STATES PATENTS

| | | |
|---|---|---|
| 1,595,368 | Volis | Aug. 10, 1926 |
| 2,446,071 | Aller | July 27, 1948 |
| 2,501,965 | Rupley | Mar. 28, 1950 |
| 2,524,984 | Manvers | Oct. 10, 1950 |
| 2,623,294 | Fox | Dec. 30, 1952 |

FOREIGN PATENTS

| | | |
|---|---|---|
| 554,054 | Great Britain | June 17, 1943 |
| 601,908 | Great Britain | May 14, 1948 |